W. A. DARRAH.
DOUGH MIXING APPARATUS.
APPLICATION FILED OCT. 4, 1920.
1,396,408.
Patented Nov. 8, 1921.
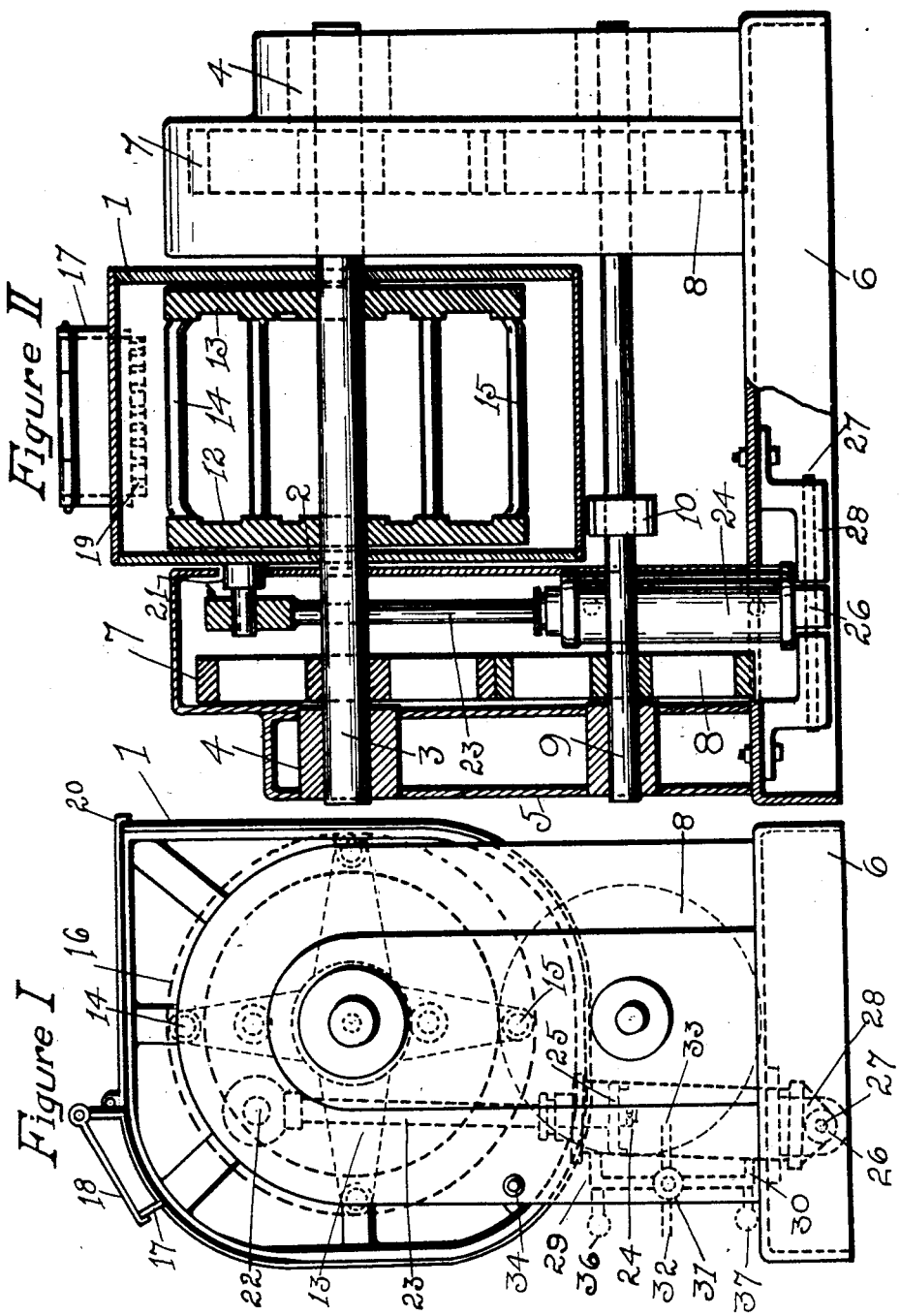
William A. Darrah,
Inventor

UNITED STATES PATENT OFFICE.

WILLIAM A. DARRAH, OF CHICAGO, ILLINOIS, ASSIGNOR TO THE EKCO ENGINEERING COMPANY, OF CHICAGO, ILLINOIS.

DOUGH-MIXING APPARATUS.

1,396,408.

Specification of Letters Patent.

Patented Nov. 8, 1921.

Application filed October 4, 1920. Serial No. 414,464.

*To all whom it may concern:*

Be it known that I, WILLIAM A. DARRAH, a citizen of the United States, residing at Chicago, in the county of Cook and State of Illinois, have invented a new and useful Improvement in Dough-Mixing Apparatus, of which the following is the specification.

This invention relates to apparatus for mixing and kneading materials, and is particularly suited for the preparation of dough used in the process of making bread, cake and similar materials, although it will be obvious that the same equipment may be employed, with only minor changes, for the mixing of various other materials, such as paints, molded compositions, carbon for electrode purposes, and other applications.

The object of this invention is to provide simple, effective and durable equipment for thoroughly mixing and kneading various materials. Other objects are to reduce the labor involved in handling the material kneaded. The invention also provides a resilient means for absorbing shocks in the mechanism, thus materially increasing the life of the apparatus, reducing the wear and depreciation, and allowing the satisfactory use of a lighter and less expensive design. Other objects will be apparent from a consideration of the description and drawings.

Referring to the drawing, Figure I shows a vertical end elevation of one form of my invention, part of the elevation being in section to more clearly disclose the details. Fig. II is a vertical side elevation partly in section.

In Fig. I, (1) indicates the mixing trough mounted by bearing (2) on shaft (3) which is supported in pillow block (4) carried by standard (5). Standard (5) is carried by base (6) or other suitable support. Spur gear (7) is mounted upon shaft (3) and serves to drive shaft (3) by meshing the gear (8) which is carried on shaft (9). Shaft (9) may be driven by a silent chain carried by sprocket (10) and moved by motor (11). It will be obvious that many other mechanical equivalents can be employed and still come within the spirit of this invention.

Spiders (12) and (13) are keyed to shaft (3) and rotate with shaft (3) within drum (1). Arms (14) and (15) are carried by spiders (12) and (13) and serve to mix the ingredients which are to be blended. If desired, the mixing arms may be hollow and supplied with air under pressure, (or any other desired gases) which may thus be incorporated with the material to be mixed.

The dotted circle (16) indicates the path of travel of the extreme points of the beater arms. It will be noted that drum (1) is mounted eccentrically with regard circle (16) and that therefore different portions of the drum are at different distances from the beater arms, thus allowing a varying clearance for purposes which will be described later.

A hopper (17) is provided on drum (1) for charging the material into the mixer. A cover (18) may be provided on said hopper (17) and grates or screens (19) are so placed as to make it impossible for the operator to injure his hand while operating the mixer. Cover (20) is provided for removing the material from the mixer.

A boss (21) is provided on the end of drum (1). Boss (21) carries stud (22) which engages with rod (23) of cylinder (24). A piston (25) is placed on the end of rod (23) to coöperate with cylinder (24). Cylinder (24) is provided with end piece (26) which is pivoted on shaft (27) and supported by bracket (28).

Cylinder (24) is provided with inlet connections (29) and (30) connected to four-way valve (31) which is supplied with air under pressure, or water, by inlet (32). Valve (31) is also provided with outlet (33). It should be understood that any commercial valve and cylinder may be employed for this purpose without departing from the spirit of this invention.

Locking means (34) are provided in upright (5) for holding the drum (1) in any desired position.

In operating the device, cover (18) is open while cover (20) remains closed. The various ingredients, such as flour, water, etc., are charged into the mixer through hopper (17) and the spiders (12) and (13) set into rotation by means of the motor (11) acting through the transmission system previously described.

In the operation of the mixer (particularly those which rotate from 60 to 100 revolutions per minute) there are experienced violent fluctuations of resistence due to the aggregation of the dough in various parts of the apparatus. This condition causes violent shocks on the equipment, and not infrequently results in broken parts. It is also particularly hard on the motor and driving mechanism. In the apparatus described above, the drum (1) is held in position at any desired point by the action of the fluid pressure on the piston (25) in cylinder (24). In case water is employed as the operating means for piston (25), expansion chambers (36) and (37) are provided and kept filled with air. In case piston (25) is operated by air pressure, expansion chambers are of course unnecessary.

With the equipment provided, the violence of the shocks is absorbed in the cushioning effect provided by the fluid means which hold the drum in position, for the reason that when the pressure exceeds a certain value, due to the accumulation of dough between the beater arms and drum (1), the drum (1) tends to rotate about shaft (3) in the direction of the arrow. This puts tension on rod (23) which compresses the fluid within cylinder (24) and thus moves the drum slightly in the direction of rotation. When the blow has passed, the pressure which has accumulated in the fluid system causes the drum to return to its original position.

When it is desired to empty the mixed dough from the drum (1) the four-way valve (33) is turned into such position that fluid is forced through pipe (30) into cylinder (24) from supply (32) while at the same time fluid is allowed to exhaust from cylinder (24) through pipe (29) to exhaust pipe (33). This causes piston (25) to move upward, which pushes on stud (22) rotating drum (1) into the position shown in the dotted line. The dough then falls into the dough trough where it is removed for further manipulation.

When it is desired to place a new charge into the mixer, valve (31) is turned in the reverse direction, thus pulling downward on rod (23) which returns the drum (1) to its original position. It will be evident that the operation of the cylinder (24) is smooth, uniform and silent, and the drum may be rotated without effort whether the mixer is in operation or not.

It is a well known fact that the mixing of different doughs requires slightly different equipment, mainly because of the "thickness" or viscosity of the dough. One important cause which has resulted in the purchase of different types of mixers for different doughs, has been the fact that the clearance between the beater arms and the drum is fixed, and a clearance which is satisfactory for "thin" or fluid doughs is too small for "thick" or viscous dough. The reverse condition of course is true. I have found that by rotating the drum (1) into a position such that the clearance between the lower portion of the drum and the path of the beater arms, is increased, that it is possible to use a mixer satisfactorily on very "thick" doughs, while by rotating the drum into such a position that the clearance in the lower portion of the mixer is decreased, it is possible to secure excellent results with "thin" dough.

In the device which forms the basis of this invention, it is possible to control the position of the drum (1) at all times during the mixing operation, thus making it possible to suit the mixer to any quality of dough at any time during the mixing process.

It will be obvious that many modifications can be made in the structure and arrangement of this mixer without departing from the spirit of this invention. Thus, it is possible to connect the fluid operating cylinder to the drum by means of a cable, chain or other link mechanism, although I prefer as direct and simple a construction as possible.

Having now fully described my invention, what I claim as new and wish to secure by Letters Patent in the United States, is as follows:—

1. A dough mixer comprising a drum, a rotating member therein, cast terminal plates to said drum, a projection on one of said terminals, a frame supporting said rotating member, and a fluid operated piston mounted upon said frame and engaging with said extension to move said drum.

2. A dough mixer consisting of a dough container, a rotating member therein, supports for said rotating member, an extension on said dough container, a piston rod engaging the said extension, the other end of said piston rod being operatively attached to a fluid operated cylinder arranged for turning said container.

3. A dough mixer comprising a drum, a rotating member therein, supports for said rotating member, means for turning said drum, and resilient cushioning and adjusting means for holding said drum in any desired position and for cushioning the shocks of operation.

4. A dough mixer, consisting of a dough container, a mixing element within said container, a support for said container, about which it is rotatable, and a fluid operated mechanism for rotating said container.

5. A dough mixer consisting of a dough container, a rotating element mounted therein, a shaft about which said container is rotatable, and a fluid operated cylinder for rotating said container.

6. A dough mixer consisting of a mixing element, a dough container eccentrically mounted with respect to said mixing element, and fluid operated means for moving said dough container in such manner that its lower portion approaches or recedes from said mixing element.

7. A dough mixer consisting of a dough container, a mixing element therein, a support for said dough container, a hydraulic cylinder arranged to turn said dough container, and expansion means connected to the fluid circuit of said hydraulic cylinder for allowing a limited amount of fluid to escape from said cylinder when subjected to pressure.

8. In a dough mixer, a hydraulic cylinder arranged to move said mixer, and expansion chambers into which a limited amount of fluid may pass when the cylinder is subjected to shock.

WILLIAM A. DARRAH.